United States Patent
Mu

(10) Patent No.: US 12,483,349 B2
(45) Date of Patent: Nov. 25, 2025

(54) INFORMATION INDICATION AND DETERMINATION METHODS AND APPARATUSES

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 336 days.

(21) Appl. No.: 17/576,928

(22) Filed: Jan. 15, 2022

(65) Prior Publication Data

US 2022/0140937 A1    May 5, 2022

Related U.S. Application Data

(63) Continuation of application No. PCT/CN2019/096416, filed on Jul. 17, 2019.

(51) Int. Cl.
*H04W 72/12*    (2023.01)
*H04L 1/00*    (2006.01)
*H04W 4/70*    (2018.01)
*H04W 72/1263*    (2023.01)

(52) U.S. Cl.
CPC ............. *H04L 1/0003* (2013.01); *H04W 4/70* (2018.02); *H04W 72/1263* (2013.01)

(58) Field of Classification Search
CPC ... H04L 1/0003; H04L 1/0016; H04L 1/0023; H04L 1/1812; H04L 1/1887; H04L 1/1896; H04L 5/0053; H04L 5/0094; H04W 4/70; H04W 28/04; H04W 72/1263; H04W 72/23; Y02D 30/70

See application file for complete search history.

(56) References Cited

U.S. PATENT DOCUMENTS

| | | | |
|---|---|---|---|
| 11,296,815 B2* | 4/2022 | Li | H04L 27/0012 |
| 11,528,091 B2* | 12/2022 | Lee | H04L 1/0011 |
| 2006/0111100 A1* | 5/2006 | Murata | H04L 1/1671 |
| | | | 455/423 |

(Continued)

FOREIGN PATENT DOCUMENTS

| | | |
|---|---|---|
| CN | 103125089 A | 5/2013 |
| CN | 106961318 A | 7/2017 |

(Continued)

OTHER PUBLICATIONS

Rico Alvarino et al. U.S. Appl. No. 62/778,780, filed Dec. 12, 2018 (Year: 2018).*

(Continued)

*Primary Examiner* — Wutchung Chu
(74) *Attorney, Agent, or Firm* — Cozen O'Connor

(57) ABSTRACT

Information indication and determination methods and apparatuses. The information indication method includes: issuing joint indication information based on a mapping relationship between quantity of transmission blocks (TB), and at least one of a resource allocation mode and/or a modulation coding strategy (MCS), in which the joint indication information is configured to indicate quantity of scheduled TBs and at least one of the resource allocation mode and the MCS through indicating the mapping relationship.

8 Claims, 5 Drawing Sheets

(56) References Cited

U.S. PATENT DOCUMENTS

| | | | |
|---|---|---|---|
| 2011/0085508 A1* | 4/2011 | Wengerter | H04L 5/0094 375/295 |
| 2011/0317643 A1 | 12/2011 | Gaal et al. | |
| 2013/0286884 A1* | 10/2013 | Li | H04B 7/0417 370/252 |
| 2014/0056372 A1* | 2/2014 | Nammi | H04W 72/20 375/260 |
| 2015/0117396 A1* | 4/2015 | Wang | H04L 5/0091 370/330 |
| 2015/0249511 A1* | 9/2015 | Chen | H04B 7/063 370/252 |
| 2017/0105212 A1* | 4/2017 | Li | H04W 72/23 |
| 2018/0054757 A1* | 2/2018 | Nanri | H04L 1/00 |
| 2018/0220422 A1* | 8/2018 | Bhattad | H04L 5/0064 |
| 2018/0241500 A1* | 8/2018 | Takeda | H04W 28/18 |
| 2018/0351625 A1* | 12/2018 | Xu | H04L 5/0057 |
| 2018/0376498 A1* | 12/2018 | Bhattad | H04L 1/08 |
| 2019/0036640 A1* | 1/2019 | Xu | H04L 1/0009 |
| 2019/0045554 A1* | 2/2019 | Ye | H04W 74/0833 |
| 2019/0191418 A1* | 6/2019 | Um | H04L 5/0091 |
| 2019/0191486 A1* | 6/2019 | Myung | H04L 5/0044 |
| 2019/0319737 A1* | 10/2019 | Hosseini | H04L 27/0008 |
| 2019/0320420 A1* | 10/2019 | Zhang | H04W 72/23 |
| 2020/0059812 A1* | 2/2020 | Lyu | H04W 24/10 |
| 2020/0154467 A1* | 5/2020 | Gong | H04L 5/0055 |
| 2020/0187237 A1* | 6/2020 | Su | H04L 1/1896 |
| 2020/0195372 A1* | 6/2020 | Rico Alvarino | H04L 1/0005 |
| 2020/0213056 A1* | 7/2020 | Chen | H04L 5/0053 |
| 2020/0296728 A1* | 9/2020 | Yoshimura | H04W 72/23 |
| 2020/0337077 A1* | 10/2020 | Yoshimura | H04L 1/1864 |
| 2020/0374163 A1* | 11/2020 | Zhao | H04L 5/0094 |
| 2020/0383134 A1* | 12/2020 | Tirronen | H04B 7/0626 |
| 2020/0404687 A1* | 12/2020 | Yoshimura | H04W 72/1268 |
| 2020/0413454 A1* | 12/2020 | Ye | H04W 74/0833 |
| 2022/0217581 A1* | 7/2022 | Mu | H04W 28/06 |
| 2023/0337225 A1* | 10/2023 | Alfarhan | H04W 72/232 |

FOREIGN PATENT DOCUMENTS

| | | | |
|---|---|---|---|
| CN | 108631990 A | 10/2018 | |
| EP | 4057654 A1 * | 9/2022 | H04W 72/23 |
| KR | 102453416 B1 * | 10/2022 | H04W 72/23 |
| WO | WO 2015168932 A1 | 11/2015 | |
| WO | WO 2018171771 A1 | 9/2018 | |

OTHER PUBLICATIONS

Japanese Patent Application No. 2022-502562, Office Action dated Jan. 10, 2023, 3 pages.
Japanese Patent Application No. 2022-502562, English translation of Office Action dated Jan. 10, 2023, 3 pages.
PCT/CN2019/096416 International Search Report dated Apr. 9, 2020, 4 pages.
Sequans Communications: "Consideration for scheduling multiple UL/DL TBs (R1-1907079)", 3GPP TSG RAN WG1 Meeting #96, May 16, 2019, 7 pages.
ZTE: "Summary on Multiple TB scheduling enhancement for NB-IoT (R1-1907567)", 3GPP TSG-RAN WG1 Meeting #97, May 17, 2019, 13 pages.
European Patent Application No. 19938008.0, Search and Opinion dated Jul. 6, 2022, 14 pages.
Samsung "Scheduling of multiple transport blocks for NB-IoT" 3GPP TSG RAN Meeting #97; R1-1906898;May 2019; 3 pages.
Russian Patent Application No. 2022103363, Office Action dated Aug. 15, 2022, 7 pages.
Russian Patent Application No. 2022103363, English translation of Office Action dated Aug. 15, 2022, 6 pages.
Office Action dated Aug. 29, 2022 issued in CN application No. 201980001446.7, 12 pages.
European Patent Application No. 19938008.0 Office Action dated Mar. 31, 2025, 7 pages.

\* cited by examiner

INFORMATION INDICATION AND DETERMINATION METHODS AND APPARATUSES

CROSS-REFERENCE TO RELATED APPLICATION

This application is a continuation application of PCT application No. PCT/CN2019/096416 filed on Jul. 17, 2019, the entire contents of which are incorporated herein by reference.

TECHNICAL FIELD

This application relates to a field of wireless communication technology, and more particularly, to an information indication and determination method and apparatus.

BACKGROUND

Machine Type Communication (MTC) is a typical representative of cellular IoT technology. At present, MTC technology has been widely used in smart cities, such as meter reading; smart agriculture, such as collection of information like temperature and humidity; smart transportation, such as sharing bicycles and many other fields. A terminal applying MTC technology can be referred to as an MTC terminal.

SUMMARY

Embodiments of the present disclosure discloses an information indication and determination method and apparatus.

Embodiments of the present disclosure provide an information indication method, which is applied in a base station, and includes: issuing joint indication information based on a mapping relationship between quantity of transmission blocks (TB), and at least one of a resource allocation mode and a modulation coding strategy (MCS), in which the joint indication information is configured to indicate quantity of scheduled TBs and at least one of the resource allocation mode and the MCS through indicating the mapping relationship.

Embodiments of the present disclosure provide an information determination method, which is applied to a terminal and includes: receiving joint indication information; determining quantity of transmission blocks (TB) based on a mapping relationship indicated by the joint indication information, and determining at least one of a resource allocation mode and modulation coding strategy (MCS) mapped through quantity of TBs.

Embodiments of the present disclosure provide an information indicating apparatus, which includes: one or more processors; a memory storing instructions executable by the one or more processors; in which the one or more processors are configured to: issue joint indication information based on a mapping relationship between quantity of transmission blocks (TB), and at least one of a resource allocation mode and a modulation coding strategy (MCS), in which the joint indication information is configured to indicate quantity of scheduled TBs and at least one of the resource allocation mode and the MCS through indicating the mapping relationship.

DETAILED DESCRIPTION

The network architecture and business scenarios described in the embodiments of the present disclosure are intended to more clearly illustrate the technical solutions of the embodiments of the present disclosure, and do not constitute a limitation on the technical solutions provided in the embodiments of the present disclosure. Those skilled in the art will note that the technical solutions provided in the embodiments of the present disclosure are equally applicable to similar technical problems with the evolution of the network architecture and the emergence of new business scenarios.

In the related arts, a problem of large signaling overhead occurs in a scheduling process of information transmission by the MTC terminal.

In the technical solution provided by the embodiments of the present disclosure, for indications of quantity of TBs, and at least one of resource allocation mode and MCS, different information fields in the DCI are no longer used to indicate quantity of heavy TBs and MCS and resource allocation mode, instead, mapping relationships between quantity of TBs, and the resource allocation mode and/or MCS may be indicated by using the joint indication information, and at the same time, the terminal is informed of quantity of TBs configured by the base station, along with the resource allocation mode and/or MCS configured for the terminal. In this way, the indication can be completed using only one joint indication information, which reduces the signaling overhead.

Figure 1:
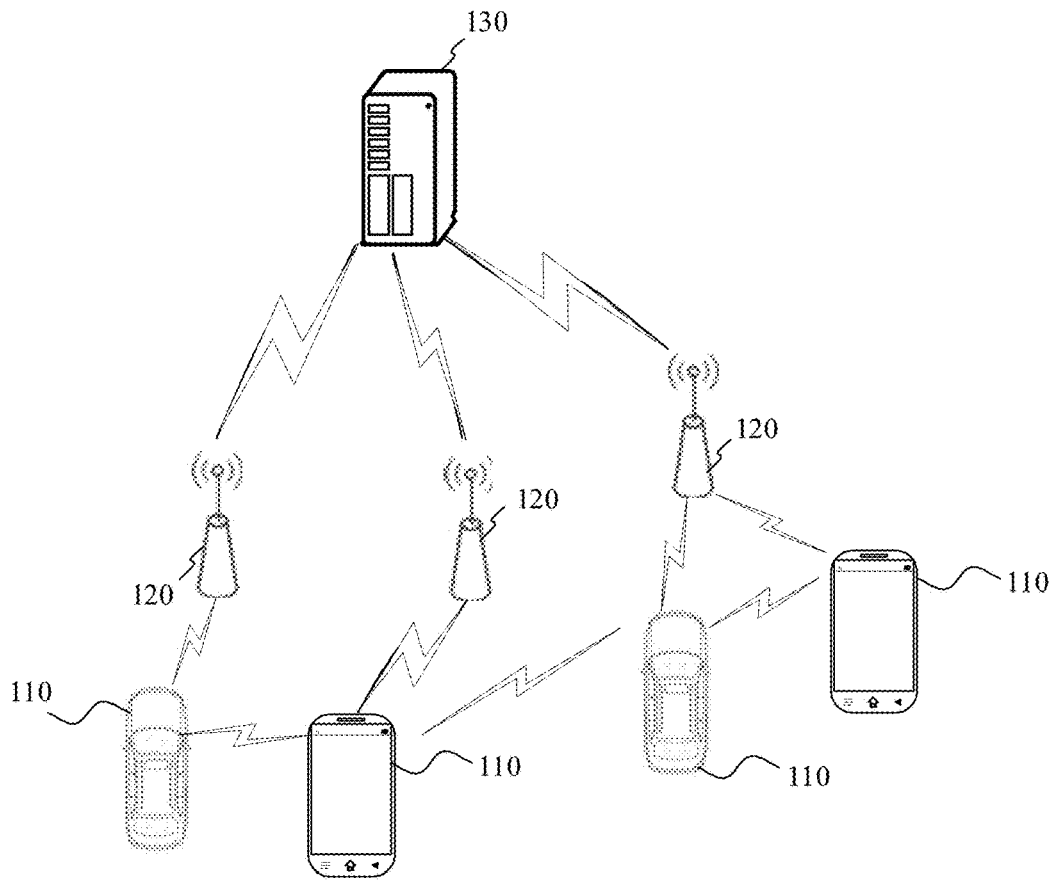
FIG. 1 is a schematic structural diagram of a wireless system provided by an embodiment of the present disclosure.

Please refer to FIG. 1, FIG. 1 shows a schematic structural diagram of a wireless system provided by an embodiment of the present disclosure. As shown in FIG. 1, the wireless communication system is a communication system based on cellular mobile communication technology. The wireless communication system may include several terminals 110 and several base stations 120.

The terminal 110 may be a device that provides voice and/or data connectivity to the user. The terminal 110 can communicate with one or more core networks via a radio access network (RAN). The terminal 110 can be an Internet of Things terminal, such as a sensor device, a mobile phone (or "cellular" phone), and a computer with the Internet of Things terminal, for example, may be a fixed, portable, pocket-sized, handheld, computer built-in device, or a vehicle-mounted device. For example, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 110 may also be a device of an unmanned aerial vehicle. Alternatively, the terminal 110 may also be a vehicle-mounted device, for example, it may be a trip computer with a wireless communication function, or a wireless communication device connected to the trip computer. Alternatively, the terminal 110 may also be a roadside device, for example, it may be a street lamp, a signal lamp, or other roadside device with a wireless communication function.

The base station 120 may be a network side device in a wireless communication system. The wireless communication system may be the 4th generation mobile communication (4G) system, also known as the Long Term Evolution (LTE) system; or, the wireless communication system may also be a fifth generation mobile communication (5G) system, also known as new radio (NR) system or 5G NR system. Alternatively, the wireless communication system may also be the next-generation system of the 5G system.

The access network in the 5G system can be called NG-RAN (New Generation-Radio Access Network).

The base station 120 may be an evolved base station (eNB) used in a 4G system. Alternatively, the base station 120 may also be a base station (gNB) adopting a centralized and distributed architecture in a 5G system. When the base station 120 adopts a centralized and distributed architecture, it usually includes a centralized unit (CU) and at least two distributed units (DU). The centralized unit is provided with protocol stacks of a packet data convergence protocol (PDCP) layer, a radio link control protocol (RLC) layer, and a media access control (MAC) layer protocol stack; distribution The unit is provided with a physical (Physical, PHY) layer. The specific implementation manner of the base station 120 will not be limited in embodiments of the present disclosure.

A wireless connection can be established between the base station 120 and the terminal 110 through a wireless air interface. In different embodiments, the wireless air interface is a wireless air interface based on the fourth generation mobile communication network technology (4G) standard; or, the wireless air interface is a wireless air interface based on the fifth generation mobile communication network technology (5G) standard. For example, the wireless air interface is a new air interface; or, the wireless air interface may also be a wireless air interface based on a next-generation mobile communication network technology standard of 5G.

In some embodiments, an E2E (End to End) connection may also be established between the terminals 110. For example, V2V (vehicle to vehicle) communication, V2I (vehicle to Infrastructure) communication and V2P (vehicle to pedestrian) communication in vehicle to everything (V2X) communication and the like.

In some embodiments, the above-mentioned wireless communication system may further include a network management device 130.

Several base stations 120 are connected to the network management device 130 respectively. The network management device 130 may be a core network device in a wireless communication system. For example, the network management device 130 may be a mobility management entity (MME) in an Evolved Packet Core (EPC) network. Alternatively, the network management device may also be other core network devices, such as Serving GateWay (SGW), Public Data Network GateWay (PGW), and Policy and Charging Rules function unit (PCRF) or Home Subscriber Server (HSS), etc. The implementation form of the network management device 130 is not limited in the embodiment of the present disclosure.

Figure 2:
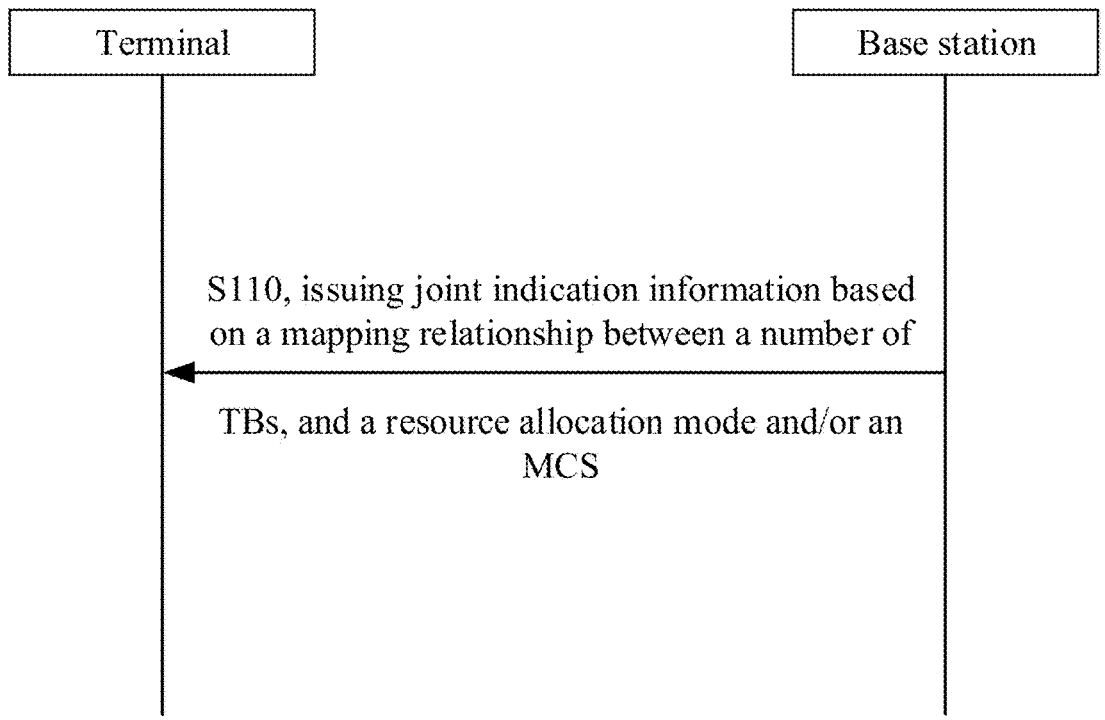
FIG. 2 is a schematic flowchart of an information indication method provided by an embodiment of the present disclosure.

As shown in FIG. 2, this embodiment provides an information indication method, including: step S110, issuing joint indication information based on a mapping relationship between quantity of transmission blocks (TB), and a resource allocation mode and/or a modulation coding strategy (MCS), in which the joint indication information is configured to indicate quantity of scheduled TBs and at least one of the resource allocation mode and the MCS through indicating the mapping relationship.

The information indication method can be applied to a base station.

The information indication method provided in this embodiment can be applied to a base station. The TB here is a kind of content block; different TBs contain different data content.

The base station pre-configures the mapping relationship between quantity of TBs and the resource configuration mode and/or MCS; or, pre-prescribes in the communication protocol the mapping relationship between quantity of TBs and the resource configuration mode and/or MCS.

Different numbers of TBs refer to the numbers of TBs that transfer different content. Quantity of TBs is related to the amount of data that the terminal needs to transmit.

For example, the amount of data of the MTC terminal may require one or more TBs for transmission.

In this embodiment, in order to reduce signaling overhead, a mapping relationship is established or known in advance, and the mapping relationship is divided into at least three types:
  a first type: a mapping relationship between quantity of TBs and the resource allocation mode;
  a second type: a mapping relationship between quantity of TBs and the MCS;
  a third type: a mapping relationship between quantity of TBs and the resource allocation mode and the MCS at the same time.

Different mapping relationships may be sorted and set with different indication values or index values for indication. In this embodiment, the mapping relationship directly indicated by the joint indication information. In this way, after receiving the joint indication information, the terminal knows which mapping relationship is currently indicated, so as to determine quantity of TBs, the resource allocation mode and/or MCS contained in the mapping relationship, thereby determining quantity of TBs, and at least one of the resource allocation mode and MCS.

MCS levels are also related to rate values. On the basis of quantity of TBs, MCS level corresponding to a higher rate value may be firstly considered.

The joint indication information may be an information field in DCI. In this way, one information field may be used to indicate at least two types of information, or even three types of information at the same time. An information field is set for each type of information, which reduces signaling overhead.

Figure 3:
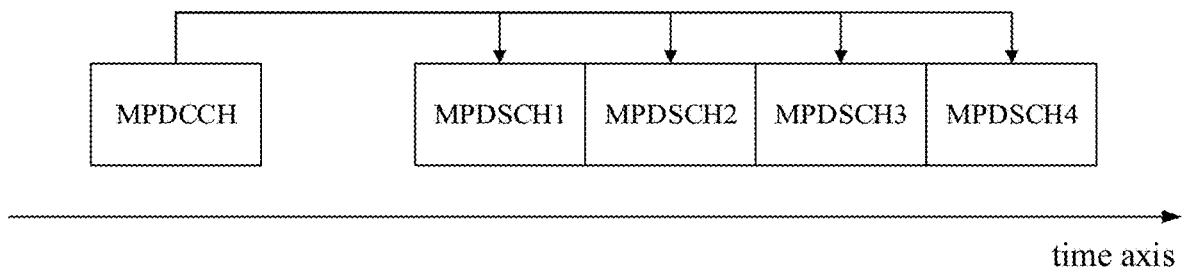
FIG. 3 is a schematic diagram of an indication of an MPDCCH message of an MTC terminal according to an embodiment of the present disclosure.

The DCI may be a component of an MPDCCH message sent through an MTC Physical Downlink Control Channel (MPDCCH). In FIG. 3, the MPDCCH message at one time schedules MPDSCH at four times for transmission. The 4 MPDSCHs in FIG. 3 are MPDSCH1, MPDSCH2, MPDSCH3, and MPDSCH4.

In this embodiment, the joint indication information may be information carried in the MPDCCH message. The MPDCCH message is a message sent using the MPDCCH. In MTC coverage enhanced mode A, the DCI issued by the MPDCCH at one time can schedule up to 8 downlink received TBs. In coverage enhanced mode B, a downlink control information (DCI) issued by an MPDCCH can schedule up to 4 downlink received TBs.

Table 1 is a mapping relationship between quantity of TBs and resource allocation modes.

TABLE 1

| | | resource allocation mode | | |
|---|---|---|---|---|
| DCI (5 bits) | quantity of scheduled TBs | resource start location (serial number of physical resource blocks (PRB)) | allocated resource amount (quantity of PRBs) | allocated resource location (set of serial number of PRBs) |
| 00000 | 1 | 1 | 1 | 1 |
| 00001 | | 1 | 2 | 1, 2 |
| 00010 | | 1 | 3 | 1, 2, 3 |
| 00011 | | 1 | 4 | 1, 2, 3, 4 |
| 00100 | | 1 | 5 | 1, 2, 3, 4, 5 |
| 00101 | | 1 | 6 | 1, 2, 3, 4, 5, 6 |
| 00110 | | 2 | 1 | 2 |
| 00111 | | 2 | 2 | 2, 3 |
| 01000 | | 2 | 3 | 2, 3, 4 |
| 01001 | | 2 | 4 | 2, 3, 4, 5 |
| 01010 | | 2 | 5 | 2, 3, 4, 5, 6 |
| 01011 | | 3 | 1 | 3 |
| 01100 | | 3 | 2 | 3, 4 |
| 01101 | | 3 | 3 | 3, 4, 5 |
| 01110 | | 3 | 4 | 3, 4, 5, 6 |
| 01111 | | 4 | 1 | 4 |
| 10000 | | 4 | 2 | 4, 5 |
| 10001 | | 4 | 3 | 4, 5, 6 |
| 10010 | | 5 | 1 | 5 |
| 10011 | | 5 | 2 | 5, 6 |
| 10100 | | 6 | 1 | 6 |
| 10101 | 2 | 1 | 3 | 1, 2, 3 |
| 10110 | | 4 | 3 | 4, 5, 6 |
| 10111 | | 1 | 6 | 1, 2, 3, 4, 5, 6 |
| 11000 | 3 | 1 | 6 | 1, 2, 3, 4, 5, 6 |
| 11001 | 4 | 1 | 6 | 1, 2, 3, 4, 5, 6 |
| 11010 | 5 | 1 | 6 | 1, 2, 3, 4, 5, 6 |
| 11100 | 6 | 1 | 6 | 1, 2, 3, 4, 5, 6 |
| 11101 | 7 | 1 | 6 | 1, 2, 3, 4, 5, 6 |
| 11110 | 8 | 1 | 6 | 1, 2, 3, 4, 5, 6 |
| 11111 | reserved bits | | | |

It can be seen from Table 1 that, 5 bits in the DCI are used to carry the joint indication information. After receiving the 5 bits in the DCI, the terminal such as an MTC terminal may know quantity of TBs currently configured by the base station and the resource configuration for transmitting these TBs by looking up the table; thus, it has the characteristic of low signaling overhead.

Figure 4:
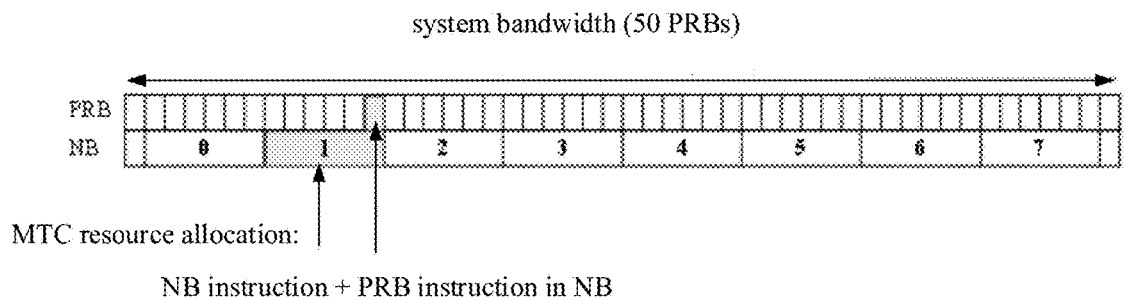
FIG. 4 is a schematic diagram of a resource allocation method of an MTC terminal provided by an embodiment of the present disclosure.

A receiving end of the joint indication information provided in this embodiment may be an MTC terminal. The low complexity and low cost of the MTC terminal is achieved by limiting the communication bandwidth of the MTC terminal. The MTC terminal can support the communication bandwidth of 6 PRBs, so as to support the MTC narrow band communication mode. In some communication systems, the entire system bandwidth is divided into multiple narrow bands (NB). The base station first allocates one of the multiple narrow bands to a certain MTC terminal, and then further allocates PRB resources in the allocated narrow band. The specific implementation is shown in FIG. 4. The system bandwidth shown in FIG. 4 is 50 PRBs. By indicating quantity of the NB, it is equivalent to indicate the set of resources allocated for the MTC terminal, and then specifically indicating which PRB in the NB is assigned to the MTC terminal. For the allocation of the PRB in the narrow band, the allocated resources are indicated in an indication manner indicating the starting point of the allocation and the amount of allocated resources. Therefore, in this embodiment, for compatibility with related technologies, the corresponding resource allocation mode in the mapping relationship can be characterized by the start point of resource allocation and the amount of allocated resources. Table 2 shows mapping relationships between quantity of TBs and MCS.

TABLE 2

| DCI (5 bits) | quantity of scheduled TBs | serial number of MCS levels |
|---|---|---|
| 00000 | 1 | 0 to 15 |
| 00001 | | |
| 00010 | | |
| 00011 | | |
| 00100 | | |
| 00101 | | |
| 00110 | | |
| 00111 | | |
| 01000 | | |
| 01001 | | |
| 01010 | | |
| 01011 | | |
| 01100 | | |
| 01101 | | |
| 01110 | | |
| 01111 | | |
| 10000 | 2 | 9, 11, 13, 15 |
| 10001 | | |
| 10010 | | |
| 10011 | | |
| 10100 | 3 | 11, 13 |
| 10101 | | |
| 10110 | 4 | 11, 13 |
| 10111 | | |
| 11000 | 5 | 11, 13 |
| 11001 | | |
| 11010 | 6 | 11, 13 |
| 11011 | | |
| 11100 | 7 | 11, 13 |
| 11101 | | 11, 13 |
| 11110 | 8 | 11, 13 |
| 11111 | reserved bits | reserved bits |

It can be seen from Table 2 that, 5 bits in the DCI are used to carry the joint indication information. After receiving the 5 bits in the DCI, the terminal such as an MTC terminal may know quantity of TBs currently configured by the base station and the MCS level for transmitting these TBs by looking up the table; thus, it has the characteristic of low signaling overhead.

The MTC terminal supports two enhanced coverage modes, namely enhanced coverage mode A and enhanced coverage mode B. the coverage enhanced mode A is used when channel conditions are good, so quantity of repetitive transmissions that can be supported under coverage enhanced mode A is relatively small.

The coverage enhanced mode B is usually applied to poor channel conditions, so quantity of repetitive transmissions that can be supported is relatively large.

In the two coverage enhanced modes, the base station first configures multiple optional retransmission times for the terminal through high-level signaling (for example, RRC signaling), for example, configures 4 optional retransmission times. The base station will set an appropriate number of repeated transmissions among multiple candidate repeated transmissions according to the user's current channel conditions and MCS selection, which is indicated in the DCI. The high-level signaling here may be signaling above the physical layer, for example, through media access control (MAC) layer signaling or radio resource control (RRC) signaling layer signaling.

The MTC terminal supports different modulation and demodulation schemes to cope with different channel scenarios. For example, in MTC coverage enhanced mode A, 16 MCSs are supported. 16 kinds of MCS can carry different numbers of information bits in different resource allocations.

In Table 3, $I_{MCS}$ represents the serial number of the MCS level, and $I_{TBS}$ is the serial number of the corresponding TBS. $N_{PRB}$ represents quantity of physical resources allocated to the user. The numbers in Table 2 indicate information bits carried by data blocks transmitted under different modulation and coding schemes and different resource configurations. For example, when $I_{MCS}$ is 9 and $N_{PRB}$ is 6, the size of the corresponding data block is 936.

TABLE 3

| $I_{MCS}$ | $I_{TBS}$ | $N_{PRB}$ | | | | |
|---|---|---|---|---|---|---|
| | | 1 | 2 | 3 | 4 | 5 | 6 |
| 0 | 0 | 0 | 16 | 32 | 56 | 88 | 120 | 152 |
| 1 | 1 | 24 | 56 | 88 | 144 | 176 | 208 |
| 2 | 2 | 32 | 72 | 144 | 176 | 208 | 256 |
| 3 | 3 | 40 | 104 | 176 | 208 | 256 | 328 |
| 4 | 4 | 56 | 120 | 208 | 256 | 328 | 408 |
| 5 | 5 | 72 | 144 | 224 | 328 | 424 | 504 |
| 6 | 6 | 328 | 176 | 256 | 392 | 504 | 600 |
| 7 | 7 | 104 | 224 | 328 | 472 | 584 | 712 |
| 8 | 8 | 120 | 256 | 392 | 536 | 680 | 808 |
| 9 | 9 | 136 | 296 | 456 | 616 | 776 | 936 |
| 10 | 10 | 144 | 328 | 504 | 680 | 872 | 1032 |
| 11 | 11 | 176 | 376 | 584 | 776 | 1000 | 1192 |
| 12 | 12 | 208 | 440 | 680 | 904 | 1128 | 1352 |
| 13 | 13 | 224 | 488 | 744 | 1000 | 1256 | 1544 |
| 14 | 14 | 256 | 552 | 840 | 1128 | 1416 | 1736 |
| 15 | 15 | 280 | 600 | 904 | 1224 | 1544 | 1800 |

Table 4 is a mapping relationship between quantity of TBs and the resource allocation mode and MCS.

TABLE 4

| | | PRB allocation | | | |
|---|---|---|---|---|---|
| DCI (5 bits) | quantity of scheduled TBs | resource start location (serial number of PRB) | allocated resource amount (quantity of PRBs) | MCS level | TBS value |
| 00000 | 1 | 1 | 1 | 0 | 16 |
| 00001 | | 1 | 1 | 2 | 32 |
| 00010 | | 1 | 3 | 0 | 56 |
| 00011 | | 1 | 3 | 1 | 88 |
| 00100 | | 1 | 2 | 4 | 120 |
| 00101 | | 1 | 3 | 3 | 176 |
| 00110 | | 1 | 2 | 7 | 224 |
| 00111 | | 1 | 6 | 3 | 328 |
| 01000 | | 1 | 4 | 6 | 392 |
| 01001 | | 1 | 3 | 6 | 456 |
| 01010 | | 1 | 5 | 6 | 504 |

TABLE 4-continued

| | | PRB allocation | | | |
|---|---|---|---|---|---|
| DCI (5 bits) | quantity of scheduled TBs | resource start location (serial number of PRB) | allocated resource amount (quantity of PRBs) | MCS level | TBS value |
| 01011 | | 1 | 6 | 6 | 600 |
| 01100 | | 1 | 5 | 8 | 680 |
| 01101 | | 1 | 5 | 5 | 776 |
| 01110 | | 1 | 5 | 10 | 872 |
| 01111 | | 1 | 5 | 11 | 1000 |
| 10000 | 2 | 1 | 5 | 8 | 680 |
| 10001 | | 1 | 5 | 5 | 776 |
| 10010 | | 1 | 5 | 10 | 872 |
| 10011 | | 1 | 5 | 11 | 1000 |
| 10100 | 3 | 1 | 5 | 5 | 776 |
| 10101 | | 1 | 5 | 11 | 1000 |
| 10110 | 4 | 1 | 5 | 5 | 776 |
| 10111 | | 1 | 5 | 11 | 1000 |
| 11000 | 5 | 1 | 5 | 5 | 776 |
| 11001 | | 1 | 5 | 11 | 1000 |
| 11010 | 6 | 1 | 5 | 5 | 776 |
| 11011 | | 1 | 5 | 11 | 1000 |
| 11100 | 7 | 1 | 5 | 5 | 776 |
| 11101 | | 1 | 5 | 11 | 1000 |
| 11110 | 8 | 1 | 5 | 5 | 776 |
| 11111 | | 1 | 5 | 11 | 1000 |

It can be seen from Table 4 that, 5 bits in the DCI are used to carry the joint indication information. After receiving the 5 bits in the DCI, the terminal such as an MTC terminal may know quantity of TBs currently configured by the base station and the MCS level for transmitting these TBs and MCS level used by the TBs by looking up the table; thus, it has the characteristic of low signaling overhead.

A transmission block size (TBS) in Table 4 refers to a combination of PRB allocation and MCS level, and different TBS values correspond to different combinations of PRB and MCS levels.

In some embodiments, the mapping relationship between quantity of TBs and resource allocation mode includes: a mapping relationship between quantity of TBs and resource allocation modes with different resource granularities as scheduling units; and/or, a mapping relationship between quantity of TBs and resource allocation modes for resource scheduling on different resource sets.

Different resource granularities correspond to different resource amounts. For example, the resource granularity may include: one PRB, one slot, one sub-slot, one symbol, one carrier, one sub-carrier, and so on.

The resource granularity may be a time domain resource granularity and/or a frequency domain resource granularity.

In this embodiment, a mapping relationship between quantity of TBs and the resource configuration mode with different resource granularities as the scheduling unit is established.

As shown in Table 1, when quantity of TBs is 1, one PRB is used as the scheduling unit for resource allocation; in this way, when quantity of TBs is 1, the resources allocated to PRBs may be an arbitrary integer, and at least one PRB. When quantity of TBs is 2, 3 PRBs are used as a scheduling unit for resource allocation; thus, when quantity of TBs is 2, the configured resources are integer multiples of 3 PRBs, and at least 3 PRBs. When quantity of TBs is greater than or equal to 3, 6 PRBs are used as a scheduling unit for resource allocation. Therefore, when quantity of TBs is equal to or greater than 3, the resources allocated for these TBs are integer multiples of 6 PRBs, and at least 6 PRB.

In some embodiments, quantity of resources included in different resource sets may be different; and/or the resource locations of resources included in different resource sets may be different.

In this embodiment, at least one resource included in different resource sets is different. For example, quantity of PRBs included in different resource sets is different, and the locations of resources included in different resource sets are different. The resource location here includes: a frequency domain location and/or a time domain location.

In some embodiments, the mapping relationship between quantity of TBs and the resource allocation modes with different resource granularities as scheduling units includes: a mapping relationship between quantity of TBs less than a first threshold and a resource allocation mode with a first resource granularity as a scheduling unit; and/or, a mapping relationship between quantity of TBs equal to or greater than the first threshold and a resource allocation mode with a second resource granularity as a scheduling unit; in which, the second resource granularity is greater than the first resource granularity.

Here, the first resource granularity and the second resource granularity may both be an integer number of PRBs.

For example, the scheduling unit of resource allocation in Table 1 may be 1 PRB, 3 PRBs, or 6 PRBs.

In this embodiment, the larger quantity of TBs scheduled, the more resources needed to transmit TBs, so resource allocation will be performed with a larger resource granularity, so as to meet the resource allocation requirements of a large number of TB transmissions.

In some embodiments, the mapping relationship between quantity of TBs and resource allocation modes for resource scheduling on different resource sets includes: a mapping relationship between quantity of TBs less than a second threshold and a resource allocation mode for resource scheduling on a first resource set; a mapping relationship between quantity of TBs equal to or greater than the second threshold and a resource scheduling mode for resource scheduling on a second resource set; in which, quantity of resource combination modes included in the second resource set is smaller than quantity of resource combination modes included in the first resource set.

In this embodiment, the second threshold may be equal to or different from the first threshold.

The resource combination mode may be: composed of one or more PRBs at different resource locations.

In this embodiment, if the resource combination modes included in the second resource set and the first resource set are different, it means that the resource configuration modes are different.

In this embodiment, the larger quantity of TBs, the larger quantity of optional resources participating in transmission. In this embodiment, the resource combination mode is defined in the first resource set and the second resource set in advance. In this way, the resource combination mode may be defined through the mapping relationship, which is equivalent to separately instructing each resource selected for TB transmission, thereby further reducing the bit overhead.

In some embodiments, the mapping relationship between quantity of TBs and MCS includes: a mapping relationship between quantity of TBs and a MCS set, wherein the MCS set comprises one or more MCS levels.

The mapping relationship between quantity of TBs and different MCS sets is pre-established. In this way, the mapping relationship can be indicated by the joint indication information to inform the terminal of the current number of TBs and the MCS level that can be selected by the terminal.

In some embodiments, different MCS sets include different numbers of MCS levels; and/or, different MCS sets include different MCS levels.

Some MCS sets include the same number of MCS levels, but the specific MCS levels included are different.

In this way, through the mapping relationship between quantity of TBs and the MCS set, the joint indication information can simultaneously schedule quantity of TBs to the terminal and the set of MCSs available to the terminal with a small overhead.

In some embodiments, the mapping relationship between quantity of TBs and the MCS set includes: a mapping relationship between quantity of TBs less than a third threshold and a first MCS set; a mapping relationship between quantity of TBs equal to or greater than the third threshold and less than a fourth threshold and a second MCS set, in which the second MCS set is a subset of the first MCS set; a mapping relationship between quantity of TBs equal to or greater than the fourth threshold and a third MCS set, in which the third MCS set is a subset of the second MCS set.

In this embodiment, one of the third threshold and the fourth threshold may be the same as or different from any one of the aforementioned first threshold and second threshold.

In this embodiment, any two of the first MCS set, the second MCS set, and the third MCS set are different.

In some embodiments, the first MCS set includes the second MCS set; the second MCS set includes the third MCS set.

It can be seen from Table 2 that if the third threshold is 1, the MCS levels included in the first MCS set are numbered from 0 to 15, a total of 16 MCS levels.

If the fourth threshold is 3, the serial numbers of MCS levels included in the second MCS set are 9, 11, 13, and 15. The serial numbers of MCS levels included in the third MCS set are 11 and 13.

In some embodiments, the mapping relationship between quantity of TBs and the resource allocation mode and the MCS includes: a mapping relationship between quantity of TBs less than or equal to a fifth threshold and a resource allocation mode of a first number and a MCS level of a second number; and/or, a mapping relationship between quantity of TBs greater than the fifth threshold and a resource allocation mode of a third number and a MCS level of a fourth number, in which the third number is less than the first number, and the fourth number is less than the second number.

In this embodiment, there is a mapping relationship between quantity of TBs and the resource allocation mode and MCS at the same time, and the joint indication information indicates the mapping relationship of the three. In this way, after the terminal receives the joint indication information indicating the mapping relationship of the three, the terminal may know the mapping relationship between quantity of TBs, the resource allocation mode and the MCS levels scheduled by the base station to the terminal. In this way, the indication can be completed using one information field, and the signaling overhead is small.

In this embodiment, the fifth threshold may be equal to or different from any one of the aforementioned first threshold to fourth threshold.

In this embodiment, different resource allocation modes include: different numbers of allocated resources and different locations of allocated resources. In this embodiment, there are the first number of resource allocation modes and the third number of resource allocation modes, so that when quantity of TBs is smaller, quantity of supported resource allocation modes is smaller.

In some embodiments, the first number of resource allocation modes may include: the second number of resource allocation modes. That is, the resource allocation mode of the second quantity may be a subset of the resource allocation mode of the first quantity.

The first threshold to the fifth threshold may be predefined by the communication protocol, or may be negotiated between the base station and the terminal. For example, the base station issues any one of the first threshold to the fifth threshold through high-level signaling above the physical layer, for example, through media access control (MAC) layer signaling or radio resource control (RRC) signaling.

In some embodiments, the method further includes: issuing the mapping relationship between quantity of TBs, and the resource allocation mode and/or the MCS. In this way, when the terminal receives the joint indication information, the terminal may query the mapping relationship according to the joint indication information and know quantity of TBs scheduled by the base station, and know the resource allocation mode and/or MCS mapped by quantity of TBs.

Figure 5:
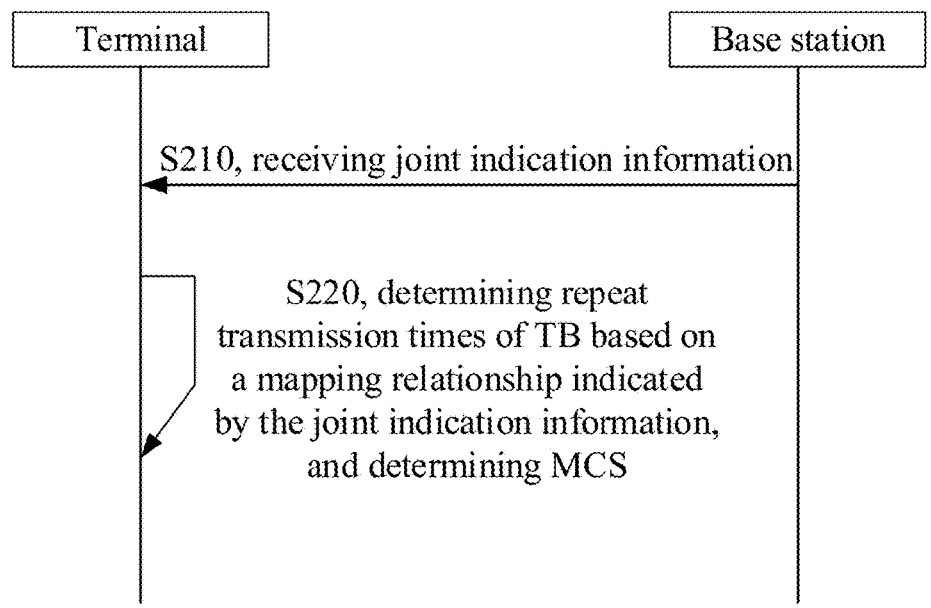
FIG. 5 is a schematic flowchart of an information determination method provided by an embodiment of the present disclosure.

As shown in FIG. 5, an information determination method is provided by an embodiment of the present disclosure. The method includes followings.

At step S210, joint indication information is received.

At step S220, quantity of transmission blocks (TB) is determined based on a mapping relationship indicated by the joint indication information, and a resource allocation mode and/or modulation coding strategy (MCS) mapped through quantity of TBs are determined.

The information determination method provided in this embodiment can be applied to a terminal.

In this embodiment, the terminal receives joint indication information, the joint indication information indicating the mapping relationship between quantity of TBs and at least one of the resource allocation mode and the MCS.

After receiving the joint indication information, the terminal decodes the joint indication information and finds the indicated mapping relationship. Based on the mapping relationship, quantity of TBs may be known at the same time of knowing one or two of the resource allocation mode and MCS.

In this embodiment, the mapping relationship can be referred to in the embodiment on the base station side, which will not be repeated here.

Figure 6:
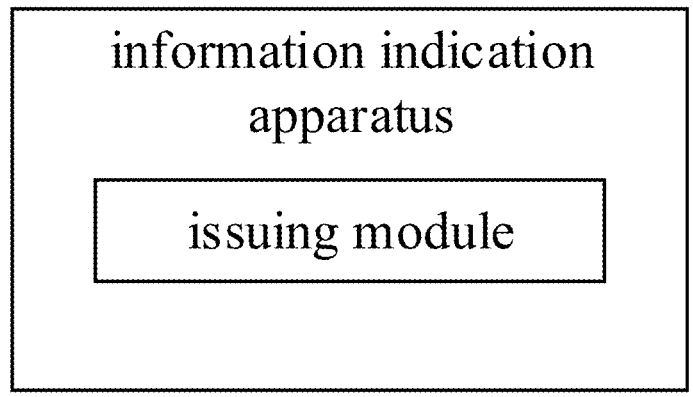
FIG. 6 is a schematic structural diagram of an information indication apparatus provided by an embodiment of the present disclosure.

As shown in FIG. 6, this embodiment provides an information indication device, including: an issuing module, configured to issue joint indication information based on a mapping relationship between quantity of transmission blocks (TB), and a resource allocation mode and/or a modulation coding strategy (MCS), wherein the joint indication information is configured to indicate quantity of scheduled TBs and at least one of the resource allocation mode and the MCS through indicating the mapping relationship.

The issuing module provided in this embodiment may be a program module, and the program module can be executed by the processor to realize the issuance of the joint indication information.

In some embodiments, the apparatus may further include: a storage module; the storage module may be configured to store the mapping relationship and/or the joint indication information.

In other embodiments, the issuing module may be a combination of software and hardware; the combination of software and hardware may be various programmable arrays; programmable arrays include but are not limited to, complex programmable arrays or field programmable arrays.

In some other embodiments, the issuing module may be a pure hardware module; the pure hardware module includes but is not limited to, an application specific integrated circuit.

In some embodiments, the mapping relationship between quantity of TBs and the resource allocation mode includes: a mapping relationship between quantity of TBs and resource configuration modes with different resource granularities as scheduling units; and/or, a mapping relationship between quantity of TBs and resource allocation modes for resource scheduling on different resource sets.

In some embodiments, resource quantities of resources included in the different resource sets are different; and/or, resource locations of the resources included in the different resource sets are different.

In some embodiments, the mapping relationship between quantity of TBs and the resource configuration modes with different resource granularities as scheduling units includes: a mapping relationship between quantity of TBs less than a first threshold and a resource allocation mode with a first resource granularity as a scheduling unit; and/or, a mapping relationship between quantity of TBs equal to or greater than the first threshold and a resource allocation mode with a second resource granularity as a scheduling unit; in which, the second resource granularity is greater than the first resource granularity.

In some embodiments, the mapping relationship between quantity of TBs and resource allocation modes for resource scheduling on different resource sets includes: a mapping relationship between quantity of TBs less than a second threshold and a resource allocation mode for resource scheduling on a first resource set; a mapping relationship between quantity of TBs equal to or greater than the second threshold and a resource scheduling mode for resource scheduling on a second resource set; in which, quantity of resource combination modes included in the second resource set is smaller than quantity of resource combination modes included in the first resource set.

In some embodiments, the mapping relationship between quantity of TBs and MCS includes: a mapping relationship between quantity of TBs and a MCS set, wherein the MCS set comprises one or more MCS levels.

In some embodiments, the mapping relationship between quantity of TBs and the MCS set includes: a mapping relationship between quantity of TBs less than a third threshold and a first MCS set; a mapping relationship between quantity of TBs equal to or greater than the third threshold and less than a fourth threshold and a second MCS set, in which the second MCS set is a subset of the first MCS set; a mapping relationship between quantity of TBs equal to or greater than the fourth threshold and a third MCS set, in which the third MCS set is a subset of the second MCS set.

In some embodiments, the mapping relationship between quantity of TBs and the resource allocation mode and the MCS includes: a mapping relationship between quantity of TBs less than or equal to a fifth threshold and a resource allocation mode of a first number and a MCS level of a second number; and/or, a mapping relationship between quantity of TBs greater than the fifth threshold and a resource allocation mode of a third number and a MCS level of a fourth number, in which the third number is less than the first number, and the fourth number is less than the second number.

Figure 7:
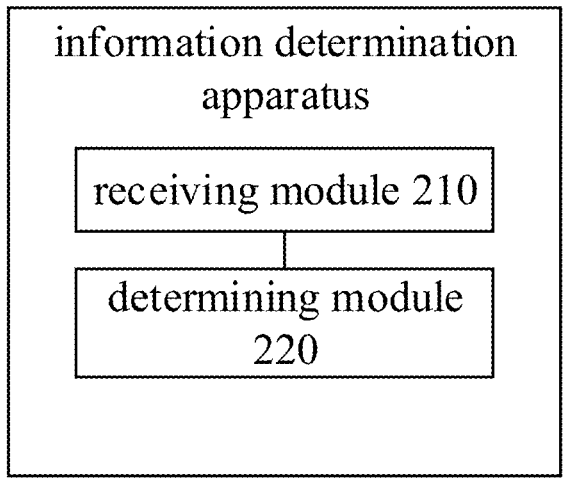
FIG. 7 is a schematic structural diagram of an information determination apparatus provided by an embodiment of the present disclosure.

As shown in FIG. 7, an information determination apparatus is provided in this embodiment. The apparatus includes: a receiving module 210, configured to receive joint indication information; a determining module 220, configured to determine quantity of transmission blocks (TB) based on a mapping relationship indicated by the joint indication information, and determine a resource allocation mode and/or modulation coding strategy (MCS) mapped through quantity of TBs.

The receiving module 210 and the determining module 220 provided in this embodiment may be program modules. After the program module is executed by a processor, the processor may be caused to realize the reception of the joint indication information, the determination of quantity of repeated transmissions and the MCS.

In other embodiments, the receiving module 210 and the determining module 220 may be a combination of software and hardware; the combination of software and hardware may be various programmable arrays; the programmable array includes but is not limited to a complex programmable array or a field programmable array.

In some other embodiments, the receiving module 210 and the determining module 220 may be pure hardware modules; the pure hardware modules include, but are not limited to, application specific integrated circuits.

In some embodiments, the determining module 220 is further configured to determine quantity of TBs according to the mapping relationship indicated by the joint indication information.

Several examples are provided below in conjunction with any of the foregoing embodiments.

Example 1

This example provides an information indication method, including: compressing an information domain using characteristics of multi-TB scheduling and a relationship between the respective information domains, and performing joint coding at the same time, so as to achieve a purpose of reducing signaling overhead.

The relationship between different information domains is used to compress the information domains, and joint coding is performed at the same time to obtain the aforementioned joint indication information. The joint indication information may be information indicating two or more kinds of information at the same time through the indication of the mapping relationship.

In the case of multi-TB scheduling, the data packet is usually relatively large. In order to reduce quantity of transmissions, when quantity of scheduled TBs is relatively large, the size of the transmission data block is limited, for example, only large data blocks are allowed to be transmitted. The size of the data block is determined by the MCS and the allocated PRB. Therefore, resources can be allocated according to quantity of scheduled TBs, and MCS can be compressed and jointly coded to obtain the aforementioned joint indication information. The joint indication information that can be carried by one information field is issued to reduce signaling overhead.

Example 2

When quantity of scheduled TBs is less than the threshold X1, a smaller-granularity resource allocation mode is adopted, for example, one PRB can be used as a unit for allocation. When quantity of scheduled TBs is greater than the threshold X1, a larger granularity is used for allocation. For example, resource allocation can be performed with a granularity of 3 PRBs or 6 PRBs.

There may be one or more TB thresholds for determining the granularity of resource allocation. The above threshold can be fixed by the protocol or configured by high-level signaling.

When a larger granularity is used for allocation, the required number of bits may be further compressed in a manner of restricting the resource allocation position. For example, when three PRBs are used as the granularity for allocation, in a narrow band (6 PRBs), only PRB 1, 2, 3 or PRB 4, 5, 6 can be allocated. It does not support PRB 2, 3, 4, or PRB 3, 4, 5 and other allocation manners.

When quantity of scheduled TBs is less than the threshold X1, a smaller-granularity resource allocation mode is adopted, for example, one PRB can be used as a unit for allocation. When quantity of scheduled TBs is greater than the threshold X1, a larger granularity is used for allocation. For example, resource allocation can be performed with a granularity of 3 PRBs or 6 PRBs.

There may be one or more TB thresholds for determining the granularity of resource allocation. The above-mentioned threshold can be fixed by the protocol, or configured by high-level signaling.

When a larger granularity is used for allocation, the required number of bits may be further compressed in a manner of restricting the resource allocation position. For example, when three PRBs are used as the granularity for allocation, in a narrow band (6 PRBs), only PRBs, 1, 2, 3 or PRBs 4, 5, and 6 can be allocated. It does not support allocation manners such as PRB 234 or PRB 345.

Example 3

Compression and joint coding between quantity of TBs and the MCS are scheduled to obtain joint indication information that can indicate quantity of TBs and the MCS level allowed to be used by the MTC terminal at the same time.

When quantity of scheduled TBs is less than a threshold Y1, more MCS levels can be used, and when quantity of scheduled TBs is greater than the threshold, quantity of MCS levels used is limited.

There may be one or more TB thresholds determined above. The above threshold can be fixed by the protocol or configured by high-level signaling. For example, when quantity of scheduled TBs is 1, all MCS levels can be used at this time. When quantity of scheduled TBs is 2, only four MCS levels can be used at this time. When quantity of scheduled TBs is greater than 2, two MCS levels are used at this time.

Example 4

Scheduling TB and PRB allocation, MCS direct compression and joint coding, can obtain the joint indication information indicating quantity of TBs to be scheduled, PRB allocated for MTC terminals, and the MCS level allowed to be used by the MTC terminal.

That is, different PRB allocations (numbers or resource locations) and MCS levels are restricted under different TB numbers, and quantity of TBs, PRB allocations and MCS levels are jointly coded.

When quantity of scheduled TBs is relatively small, such as less than the threshold Z1, more TBS options (i.e., more PRB allocation and MCS levels) can be supported at this time. When quantity of scheduled TBs is greater than the threshold Z1, the TBS selection can be restricted at this time.

There may be one or more TB thresholds determined above. The above threshold can be fixed by the protocol or configured by high-level signaling.

This embodiment also provides a communication device, including: an antenna; a memory; a processor, connected to the antenna and the memory respectively, and configured to execute computer-executable instructions stored on the memory, to control transmission and reception of the antenna, and to implement steps of the information indication method and/or the information determination method provided by any of the foregoing embodiments.

The communication device provided in this embodiment may be the aforementioned terminal or base station. The terminal can be a variety of human-borne terminals or vehicle-mounted terminals. The base station may be various types of base stations, for example, a 4G base station or a 5G base station.

The antenna may be various types of antennas, for example, a mobile antenna such as a 3G antenna, a 4G antenna, or a 5G antenna; the antenna may also include a WiFi antenna or a wireless charging antenna.

The memory may include various types of storage medium, and the storage medium is a non-transitory computer storage medium that can continue to store the information stored thereon after the communication device is powered off.

The processor may be connected to the antenna and the memory through a bus or the like, and is used to read executable programs stored on the memory, for example, through the information indication method and/or information determination method shown in FIG. 2 and/or FIG. 5.

The implementation of this application also provides a non-transitory computer-readable storage medium that stores an executable program, in which the executable program is executed by a processor to implement steps of the information indication method provided by any of the foregoing embodiments and/or the information determination method, for example, at least one of the methods shown in FIG. 2 and/or FIG. 5.

Figure 8:
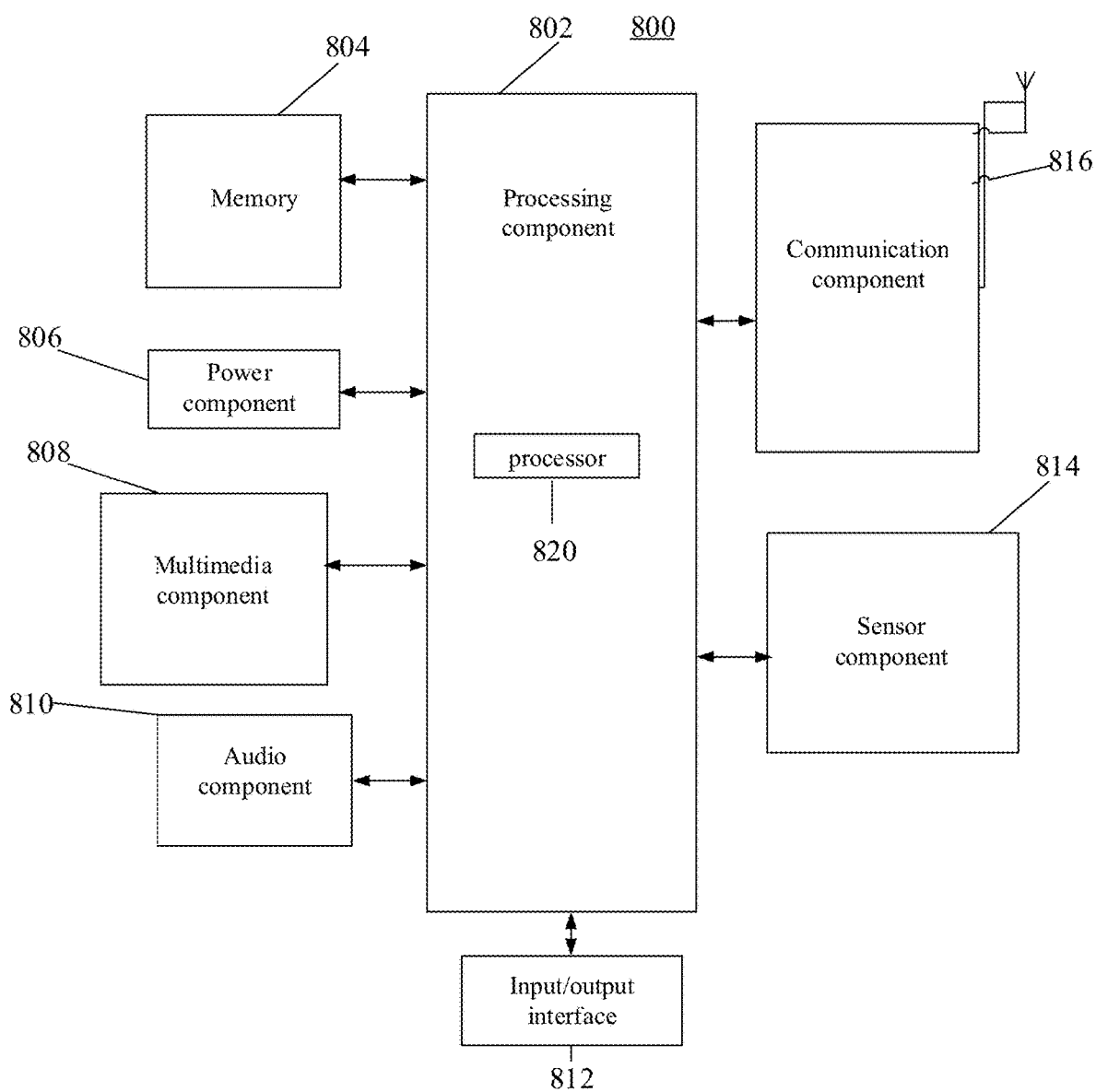
FIG. 8 is a schematic structural diagram of a terminal provided by an embodiment of the present disclosure.

FIG. 8 shows a terminal according to an exemplary embodiment. For example, the terminal may be a mobile phone, a computer, a digital broadcasting terminal, a message transceiver device, a game console, a tablet device, a medical device, a fitness device and a personal digital assistant.

As illustrated in FIG. 8, the terminal 800 may include one or more of: a processing component 802, a memory 804, a power component 806, a multimedia component 808, an audio component 810, an input/output (I/O) interface 812, a sensor component 814, and a communication component 816.

The processing component 802 generally controls overall operations of the terminal 800, such as the operations associated with display, telephone calls, data communications, camera operations, and recording operations. The processing component 802 may include one or more processors 820 to execute instructions to perform all or part of the steps in the above described method. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, and video. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the terminal 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as WiFi, 2G, or 3G, or a combination thereof. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 804, executable by the processor 820 in the terminal 800, for performing the above method. For example, the non-transitory computer-readable storage medium may be a ROM, a RAM, a CD-ROM, a magnetic tape, a floppy disc, an optical data storage device, and the like.

Figure 9:
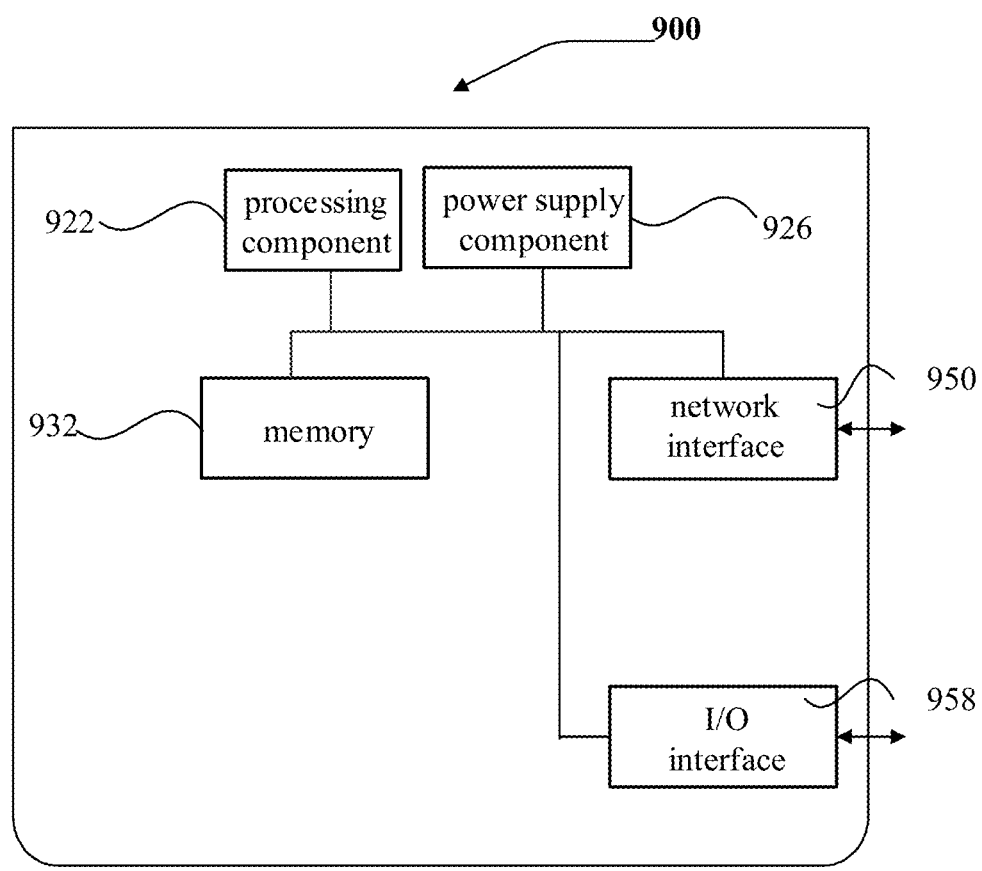
FIG. 9 is a schematic structural diagram of a base station provided by an embodiment of the present disclosure.

FIG. 9 is a schematic diagram of a base station. Referring to FIG. 9, the base station 900 includes a processing component 922, which further includes one or more processors, and a memory resource represented by a memory 932, for storing instructions that can be executed by the processing component 922, such as application programs. The application program stored in the memory 932 may include one or more modules each corresponding to a set of instructions. In addition, the processing component 922 is configured to execute instructions.

The base station 900 may also include a power supply component 926 configured to perform power management of the base station 900, a wired or wireless network interface 950 configured to connect the base station 900 to the network, and an input output (I/O) interface 958. The base station 900 can operate based on an operating system stored in the memory 932, such as Windows Server™, Mac OS X™, Unix™, Linux™, FreeBSD™ or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information indication method, performed by a base station, comprising:
    sending joint indication information based on a mapping relationship between quantity of transmission blocks (TB) and a resource allocation mode and a modulation coding strategy (MCS), wherein the joint indication information is one information field in DCI, wherein the joint indication information is configured to indicate directly quantity of scheduled TBs and the resource allocation mode and the MCS concurrently through indicating the mapping relationship;
    wherein the mapping relationship between the quantity of TBs and the resource allocation mode and the MCS comprises:
    a mapping relationship between quantity of TBs less than or equal to a threshold and a resource allocation mode of a first number and a MCS level of a second number.

2. The method of claim 1, wherein one or both of,
    numbers of MCS levels included in different MCS sets are different; or
    MCS levels included in different MCS sets are different.

3. The method of claim 1, wherein the mapping relationship between quantity of TBs and the resource allocation mode and the MCS set comprises:
    a mapping relationship between quantity of TBs greater than the threshold and a resource allocation mode of a third number and a MCS level of a fourth number, wherein the third number is less than the first number, and the fourth number is less than the second number.

4. An information determination method, performed by a terminal, comprising:
    receiving joint indication information, wherein the joint indication information is one information field in DCI; and
    directly determining quantity of transmission blocks (TB) and a resource allocation mode and a modulation coding strategy (MCS) concurrently based on a mapping relationship indicated by the joint indication information;
    wherein the mapping relationship between the quantity of TBs and the resource allocation mode and the MCS comprises:
    a mapping relationship between quantity of TBs less than or equal to a threshold and a resource allocation mode of a first number and a MCS level of a second number.

5. An information determination apparatus, comprising:
    one or more processors; and
    a memory storing instructions that, when executed by the one or more processors, cause the information determination apparatus to perform the method of claim 4.

6. An information indication apparatus, comprising:
    one or more processors;
    a memory storing instructions executable by the one or more processors;
    wherein the one or more processors are configured to:
    send joint indication information based on a mapping relationship between quantity of transmission blocks (TB) and a resource allocation mode and a modulation coding strategy (MCS), wherein the joint indication information is one information field in DCI, wherein the joint indication information is configured to indicate directly quantity of scheduled TBs and the resource allocation mode and the MCS concurrently through indicating the mapping relationship;

wherein the mapping relationship between the quantity of TBs and the resource allocation mode and the MCS comprises:

a mapping relationship between quantity of TBs less than or equal to a threshold and a resource allocation mode of a first number and a MCS level of a second number.

7. The apparatus of claim 6, wherein one or both of, numbers of MCS levels included in different MCS sets are different; or MCS levels included in different MCS sets are different.

8. The apparatus of claim 6, wherein the mapping relationship between quantity of TBs and the resource allocation mode and the MCS set further comprises:

a mapping relationship between quantity of TBs greater than the threshold and a resource allocation mode of a third number and a MCS level of a fourth number, wherein the third number is less than the first number, and the fourth number is less than the second number.

* * * * *